(12) United States Patent
Narayan et al.

(10) Patent No.: US 9,413,730 B1
(45) Date of Patent: Aug. 9, 2016

(54) ENCRYPTION IN THE CLOUD USING ENTERPRISE MANAGED KEYS

(71) Applicant: Skyhigh Networks, Inc., Cupertino, CA (US)

(72) Inventors: Kaushik Narayan, San Jose, CA (US); Paul Grubbs, Sunnyvale, CA (US)

(73) Assignee: Skyhigh Networks, Inc., Campbell, CA (US)

(*) Notice: Subject to any disclaimer, the term of this patent is extended or adjusted under 35 U.S.C. 154(b) by 25 days.

(21) Appl. No.: 14/536,465

(22) Filed: Nov. 7, 2014

Related U.S. Application Data

(60) Provisional application No. 62/007,855, filed on Jun. 4, 2014.

(51) Int. Cl.
 *H04L 29/06* (2006.01)
 *H04L 9/08* (2006.01)
(52) U.S. Cl.
 CPC .............. *H04L 63/0471* (2013.01); *H04L 9/08* (2013.01)
(58) Field of Classification Search
 CPC .................................................. H04L 63/0471
 USPC ......................................................... 713/153
 See application file for complete search history.

(56) References Cited

U.S. PATENT DOCUMENTS

| 6,996,723 | B1* | 2/2006 | Kyojima | H04L 9/3247 380/45 |
| 8,595,480 | B2* | 11/2013 | Dimitrakos | G06F 9/547 709/205 |
| 2006/0222177 | A1* | 10/2006 | Iwamoto | H04N 7/1675 380/200 |
| 2006/0271785 | A1* | 11/2006 | Holtmanns | H04L 63/06 713/171 |
| 2011/0010538 | A1* | 1/2011 | Falk | H04L 63/06 713/155 |
| 2014/0126723 | A1* | 5/2014 | Zhang | H04L 9/0822 380/279 |

* cited by examiner

*Primary Examiner* — Dant Shaifer Harriman
(74) *Attorney, Agent, or Firm* — Van Pelt, Yi & James LLP

(57) ABSTRACT

An encryption key management system and method implements enterprise managed encryption key for an enterprise using encryption for cloud-based services. In some embodiments, the enterprise deploys a key agent on the enterprise data network to distribute encryption key material to the network intermediary on a periodic basis. The network intermediary receives the encryption key material from the enterprise and stores the encryption key material in temporary storage and uses the received encryption key material to derive a data encryption key to perform the encryption of the enterprise's data. In this manner, the enterprise can be provided with the added security assurance of maintaining and managing its own encryption key while using cloud-based data storage services. The encryption key management system and method can be applied to ensure that the enterprise's one or more encryption keys do not leave the enterprise's premises.

18 Claims, 8 Drawing Sheets

ENCRYPTION IN THE CLOUD USING ENTERPRISE MANAGED KEYS

CROSS REFERENCE TO OTHER APPLICATIONS

This application claims priority to U.S. Provisional Patent Application No. 62/007,855, entitled ENCRYPTION IN THE CLOUD USING ENTERPRISE MANAGED KEYS, filed Jun. 4, 2014, which is incorporated herein by reference for all purposes.

BACKGROUND OF THE INVENTION

Cloud computing is the use of computing resources, including hardware and software, that are delivered as a service over a network, typically the Internet. As cloud computing achieves increased popularity and adoption of cloud-based services by businesses increases, concerns over security and risks of using these cloud-based services become significant. Traditionally, systems and software applications were deployed in enterprise environments, such as within an enterprise's own private data network, with strict controls and policies to ensure that data and usage are compliant with the enterprise's standards. However, the adoption of cloud-based services offered by third parties creates a potential mismatch, or complete absence, of expected enterprise level controls. Enterprises are faced with the challenge of accessing risk exposure associated with the use of cloud-based services in order to apply compensating controls.

With cloud-based services coming into widespread use, data security for data and files stored on the cloud-based service providers become an important issue.

BRIEF DESCRIPTION OF THE DRAWINGS

Various embodiments of the invention are disclosed in the following detailed description and the accompanying drawings.

DETAILED DESCRIPTION

Figure 1:
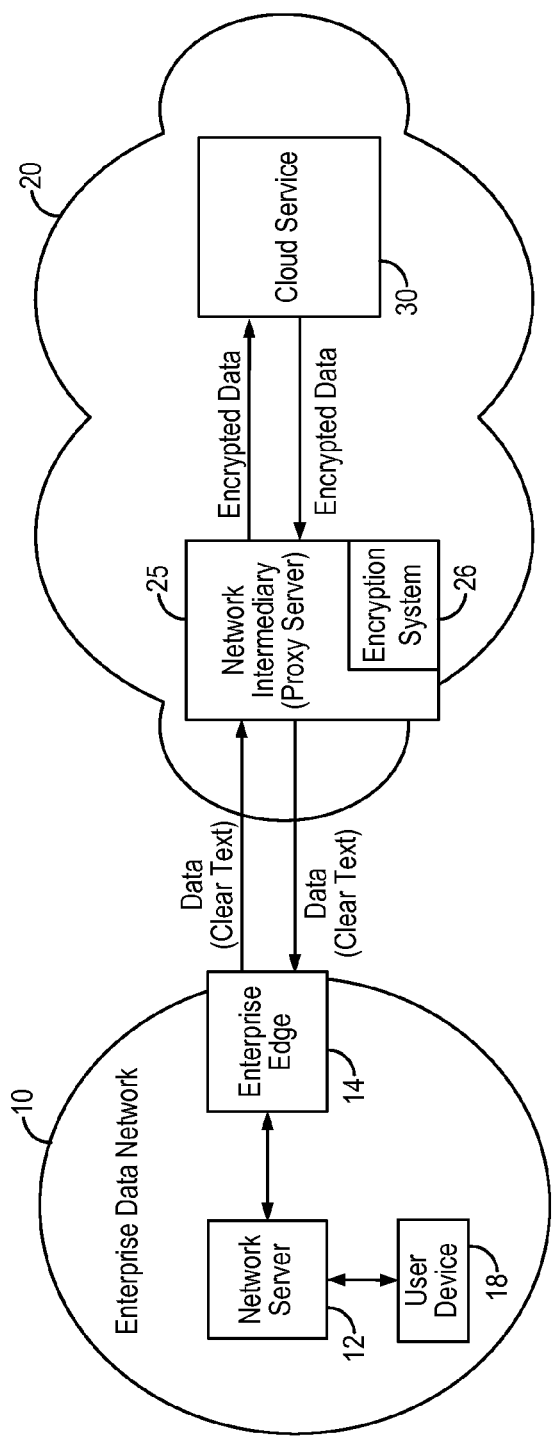
FIG. 1 is a block diagram illustrating a network intermediary implementing encryption of cloud data on behalf of an enterprise in some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

In embodiments of the present invention, an encryption key management system and method implements enterprise managed encryption key for an enterprise using encryption for cloud-based services. In this manner, the enterprise can be provided with the added security assurance of maintaining and managing its own encryption key while using cloud-based data storage services. The encryption key management system and method can be applied to ensure that the enterprise's one or more encryption keys do not leave the enterprise's premises. A salient feature of the encryption key management system of the present invention is that the system enables a network intermediary to broker encryption keys from an on-premises key server or a hardware security module (HSM) of an enterprise for encryption of sensitive data stored in cloud service providers used by the enterprise.

In the present description, a "cloud-based service" or "cloud service" refers to computing resources, including hardware and software, that are delivered as a service over a data network. In most cases, the cloud service is deployed on the publicly available Internet. In embodiments of the present invention, the cloud-based service may also be deployed on a private data network of an enterprise, or be deployed on a third party private data network, or be deployed on a personal data network. Furthermore, in the present description, "cloud content" or "cloud data" refers to data or files being processed or stored on a cloud-based service on behalf of an enterprise. The cloud-based service may be a cloud storage service, customer relationship management (CRM) services, information technology (IT) services or other types of cloud services. The cloud data or content may be stored as data files or in other formats.

With the proliferation of cloud-based services, an enterprise may wish to adopt one or more cloud-based services for data storage or other applications. Furthermore, the enterprise may deploy security measures to monitor and control the use of the cloud-based services from the enterprise's own private data network or by the enterprise's employees and users. In some cases, an enterprise data network redirects network traffic between a client device and a cloud-based service through a network intermediary. The client device may be situated within the enterprise data network or be associated with the enterprise. The network intermediary may provide monitoring and assessment of the enterprise's cloud usage.

In some cases, the network intermediary is used to provide additional security functions, such as data encryption for uploaded data, such as encryption of sensitive data to be stored in a cloud service provider. FIG. 1 is a block diagram illustrating a network intermediary implementing encryption of cloud data on behalf of an enterprise in some embodiments. Referring to FIG. 1, an enterprise may operate an enterprise data network 10 including one or more network servers 12 communicating with one or more user devices 18. The enterprise data network 10 includes an enterprise network edge 14, such as a proxy server, which is used to communicate with a public data network 20, such as the publicly accessible Internet. The enterprise or users of the enterprise data network 10 may wish to use one or more cloud services provided by cloud service providers, such as cloud service 30, that are deployed on the public data network 20. Network traffic form the user device 18 is sent to the network server 12 and travels to the enterprise network edge 14 and then onto the cloud service providers. Network traffic from the cloud service providers are received at the enterprise network edge 14 and then transmitted onto the network server 12 to be distributed to the user device 18.

To ensure security associated with the use of one or more cloud based services, the enterprise may redirect all network traffic destined for one or more cloud service providers through a network intermediary 25, which can be implemented as a network proxy server. In the present description, a proxy server refers to a server, which can be a computer system or a software application, that acts as an intermediary for requests from clients seeking resources from other servers. The network intermediary 25 may be configured as reverse/forward proxies. Thus, requests and data from the user device are intercepted by the network intermediary 25 before reaching the cloud service 30. In the following description, the term "data" will be used to refer to data or files in any format that is being exchanged in the network environment described herein. The network intermediary 25 performs encryption of the data before sending the data onto the cloud service. The cloud-based service may be a cloud storage service, customer relationship management (CRM) services, information technology (IT) services or other types of cloud services. In one embodiment, the network intermediary 25 is a cloud-based service and may be deployed on the publicly accessible Internet, such as public data network 20. In other embodiments, the network intermediary 25 may be deployed on a private data network of an enterprise, or be deployed on a third party private data network.

In some embodiments, the network intermediary 25 includes an encryption system 26 which encrypts and decrypts data based on one or more encryption algorithms. The data can be a file or data in other formats. The encryption system may utilize keys, algorithms, pseudo random number generators and encoding algorithms suitable for encrypting the data from the user device.

As thus configured, the user device 12 in the enterprise data network 10 uploads data to be processed or stored on the cloud service 30. The user's data are intercepted by the network intermediary 25. The network intermediary 25 encrypts the data and forwards the encrypted data to the cloud service provider 30 on behalf of the enterprise. In this manner, data security is ensured as data are stored on the cloud service 30 in an encrypted format. Any person accessing the cloud data on the cloud service provider directly will only see encrypted data. When data is to be retrieved from the cloud service 30, the network intermediary 25 retrieves the data and decrypts the data. The decrypted data is then provided to the requesting user device 18 of the enterprise data network 10. With the use of the network intermediary, the enterprise makes use of cloud based services with the security of the cloud data and content being encrypted at rest.

In the system configuration of FIG. 1, with the network intermediary performing encryption of the enterprise's data destined for cloud-based services, management of the encryption key remains a challenge. The network intermediary needs to have in possession an encryption key to perform the encryption for the enterprise. However, in some cases, the enterprise does not wish to share the encryption key with the network intermediary due to security concern or company security policy. In other cases, regulatory rules require the enterprise to have the cloud data encryption key stored on the enterprise's premises. Thus, while the enterprise wishes to use cloud services with data being stored encrypted at rest, the enterprise must also be able to manage their encryption keys in accordance with security and regulatory policies.

In embodiments of the present invention, an encryption key management system and method implements enterprise managed encryption key. An enterprise uses a network intermediary to intercept and encrypt data sent from the enterprise to be processed or stored on a cloud based service. In some embodiments, the enterprise deploys a key agent on the enterprise data network to distribute encryption key material to the network intermediary on a periodic basis. The network intermediary receives the encryption key material from the enterprise and stores the encryption key material in temporary storage only. The network intermediary uses the received encryption key material to derive a data encryption key to perform the encryption of the enterprise's data. In some embodiments, the key agent can be implemented in software, or hardware or both.

Figure 2:
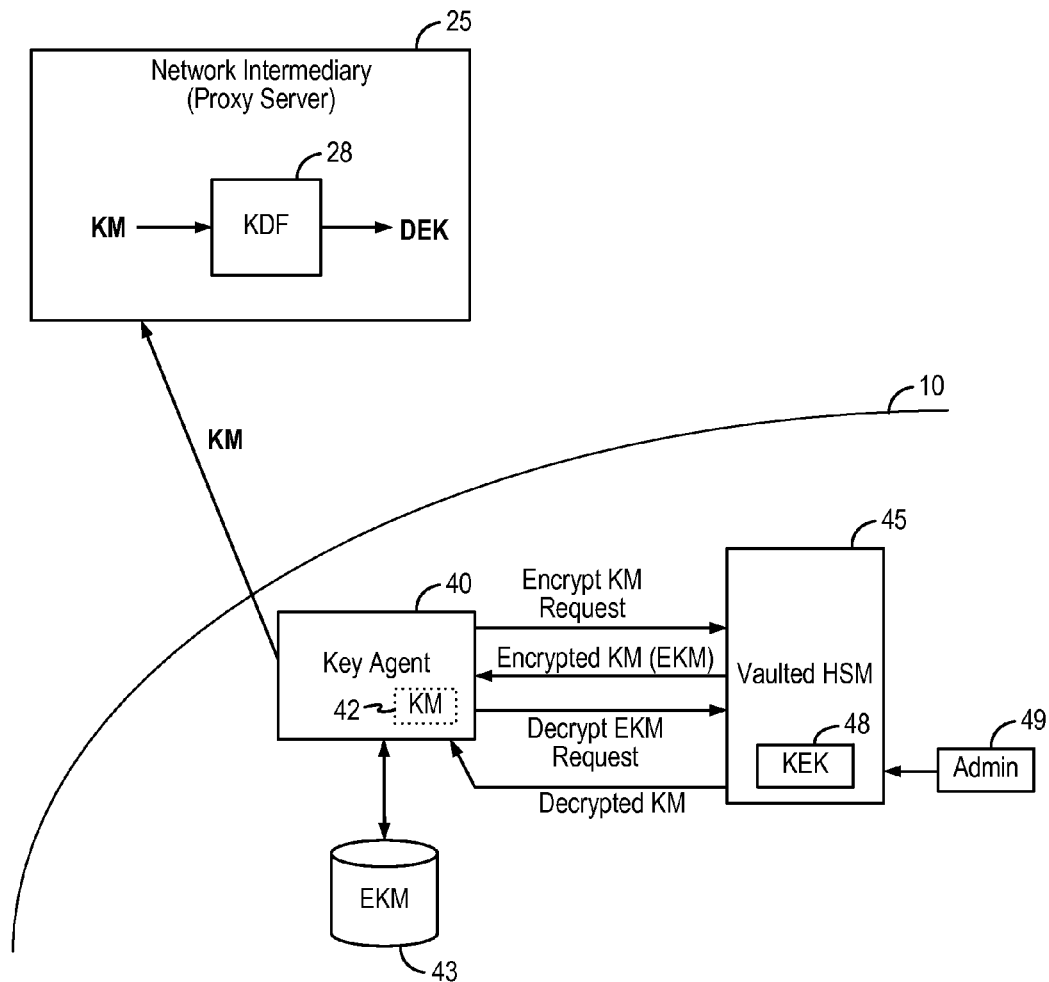
FIG. 2 is a block diagram of an encryption key management system in embodiments of the present invention.

FIG. 2 is a block diagram of an encryption key management system in embodiments of the present invention. Referring to FIG. 2, the encryption key management system is implemented in a key agent 40 deployed within the enterprise data network 10. The key agent 40 is in communication with an on-premises hardware security module (HSM) 45. The HSM 45 is running within the enterprise data network 10 and stores the encryption keys of the enterprise data network. For example, the HSM 45 may store therein the enterprise's key encryption key (KEK). In the present description, a hardware security module (HSM) is a physical computing device that safeguards and manages digital keys for strong authentication and provides encryption and decryption processing.

In other embodiments, the HSM 45 is implemented as a virtual HSM that is running on a third party data network. The virtual HSM, although deployed on a third party data network, may provide the same level of security assurance as if the enterprise is managing the keys. For example, the enterprise may manage the lifecycle of its keys on the HSM. When a virtual HSM is used to store the enterprise's encryption keys, the encryption keys are not physically hosted on the enterprise's premises. However, the enterprise still controls the key encryption key (KEK) which is provided to the virtual HSM and thus maintains control of the virtual HSM.

Whether a physical or a virtual HSM is used, a particularly useful property of the HSM is that encryption keys are generated within the module and the keys never leave the HSM.

In this manner, the enterprise can be assured that its encryption keys remain within its control and management. In the present description, the HSM 45 is described as being implemented in a vaulted HSM which can be a physical module deployed on the enterprise's premises or a virtual module deployed on a third party data network.

The encryption key management system manages the key authentication as follows. The vaulted HSM 45 has stored therein a key encryption key (KEK) 48, such as from a system administrator 49 of the enterprise. The KEK 48 is stored in the vaulted HSM 45 and is never distributed outside of the vaulted HSM 45. The KEK is used to encrypt and decrypt a key material (KM) which may be provided or generated by the key agent 40. The key material KM is to be distributed to the network intermediary 25. The network intermediary 25 receives the key material and uses a key derivation function (KDF) 28 to derive or generate a data encryption key (DEK). The network intermediary 25 then uses the DEK in the encryption of the enterprise's data to be stored on a cloud service. The network intermediary 25 also uses the DEK in the decryption of the enterprise's data retrieved from a cloud service provider through the network intermediary.

The network intermediary 25 stores the KM only in short-term or temporary memory. The KM expires after a given time duration and the network intermediary 25 must receive updated key material (KM) provided by the key agent 40 in order to continue to encrypt or decrypt data on behalf of the enterprise. In some embodiments, the key agent 40 distributes KM to the network intermediary 25 on a periodic basis, such as every 5 minutes.

As thus configured, the DEK used by the network intermediary 25 is derived from the KEK of the enterprise but the network intermediary is never provided with the enterprise's KEK and the network intermediary never uses the KEK in the encryption or decryption of data. Thus, the enterprise can maintain the security of its encryption key while using the network intermediary to provide encryption of data at rest. In the event that the enterprise wishes to revoke the authorization, the enterprise may simply revoke the KEK. With the KEK revoked, all the DEK previously generated becomes invalid and the network intermediary will no longer be able to encrypt or decrypt data on behalf of the enterprise. The network intermediary must receive new key material and once again generates new DEK using the key derivation function (KDF) and the new key material.

Figure 3:
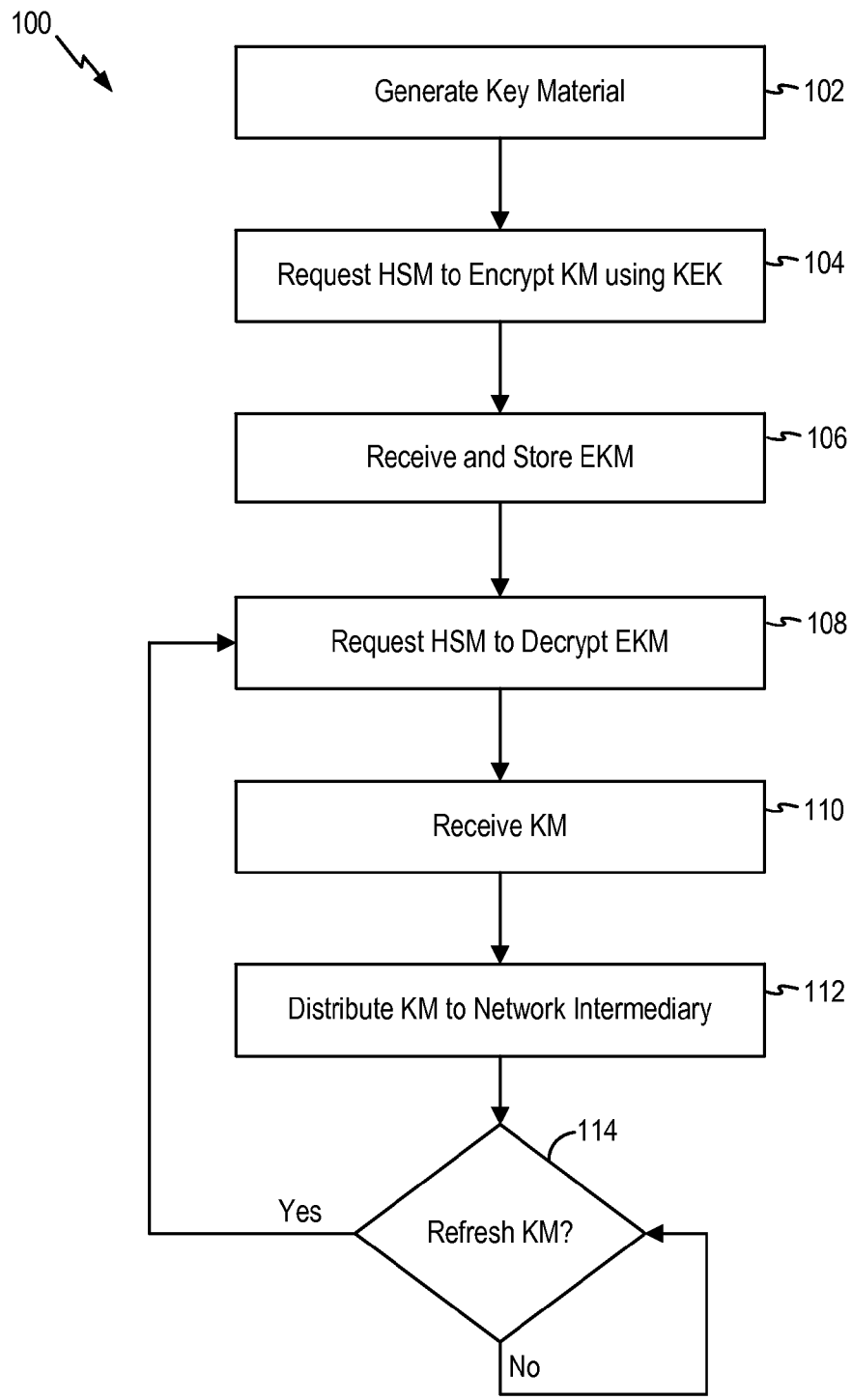
FIG. 3 is a flowchart illustrating an encryption key management method in embodiments of the present invention.

The operation of the encryption key management system will now be described with reference to the flowchart in FIG. 3. FIG. 3 is a flowchart illustrating an encryption key management method in embodiments of the present invention. In the present example, the encryption key management method is implemented at the key agent 40 which can be implemented in software, hardware or both. The key agent 40 is in communication with the vaulted HSM 45 of the enterprise which maintains a KEK 48 of the enterprise.

Referring to FIGS. 2 and 3, the encryption key management method 100 starts at 102 where the key agent 40 creates or generates a key material (KM) 42. For example, the key material 42 may be generated during startup or installation time of the key agent. The key agent 40 then requests the vaulted HSM 45 to encrypt the key material 42 using the KEK 48 of the enterprise (104). The key agent 40 receives the encrypted key material (EKM) from the vaulted HSM, encrypted using the KEK of the enterprise (106). The key agent 40 stores the EKM in a memory 43. It is imperative to note that the unencrypted key material 42 is not stored for extended time duration at the key agent 40 but rather only the encrypted key material EKM is stored in persistent storage. For example, the key agent 40 may store the unencrypted key material 42 briefly or temporarily to enable the request for the EKM but is not stored when the EKM has been received.

In the encryption key management system, the key agent 40 distributes the key material 42 to the network intermediary 25 to derive the local DEK of encryption of enterprise's data. The network intermediary 25 does not maintain a key storage but rather only store the key material received from the key agent 40 in cache memory. The key material expires after a brief time period, such as 5 minutes, and is not stored on the network intermediary. The key agent 40 is configured to distribute the key material to the network intermediary on a periodic basis, e.g. every 5 minutes.

At each time interval the key agent 40 needs to distribute the key material, the key agent 40 requests the vaulted HSM 45 to decrypt the EKM (108). The key agent 40 then receives the decrypted key material from the vaulted HSM (110). The key agent 40 then distributes the key material to the network intermediary 25 (112). Because the network intermediary 25 does not store the key material perpetually, the key agent 40 needs to refresh and redistribute the key material periodically (114). When the key material valid time period expires, the method 100 repeats at 108 where the key agent 40 again requests the vaulted HSM to decrypt the EKM.

A feature of the encryption key management system of the present invention is that the data encryption key (DEK) used to encrypt the enterprise's data is derived from a key encryption key (KEK) that is wholly under the control of the enterprise. When the enterprise wishes to revoke any previous authorization, the enterprise may change the KEK. Once the KEK is changed, the vaulted HSM 45 will not be able to decrypt the previously encrypted EKM and the key agent will no longer be able to generate key material for the network intermediary. In some embodiments, the enterprise may reinstate the authorization by starting at 102 of method 100 and have the key agent 40 generates new key material.

As thus configured, the enterprise maintains control of the KEK, the key agent generates key material that is being passed to the network intermediary but the key material is not stored anywhere in a persistent manner. The key agent stores the key material in encrypted form (encrypted key material or EKM). The network intermediary derives the data encryption key (DEK) from the key material and uses the DEK for encryption. The network intermediary only uses the key material to generate the DEK but does not use the key material for actual encryption.

Figure 4:
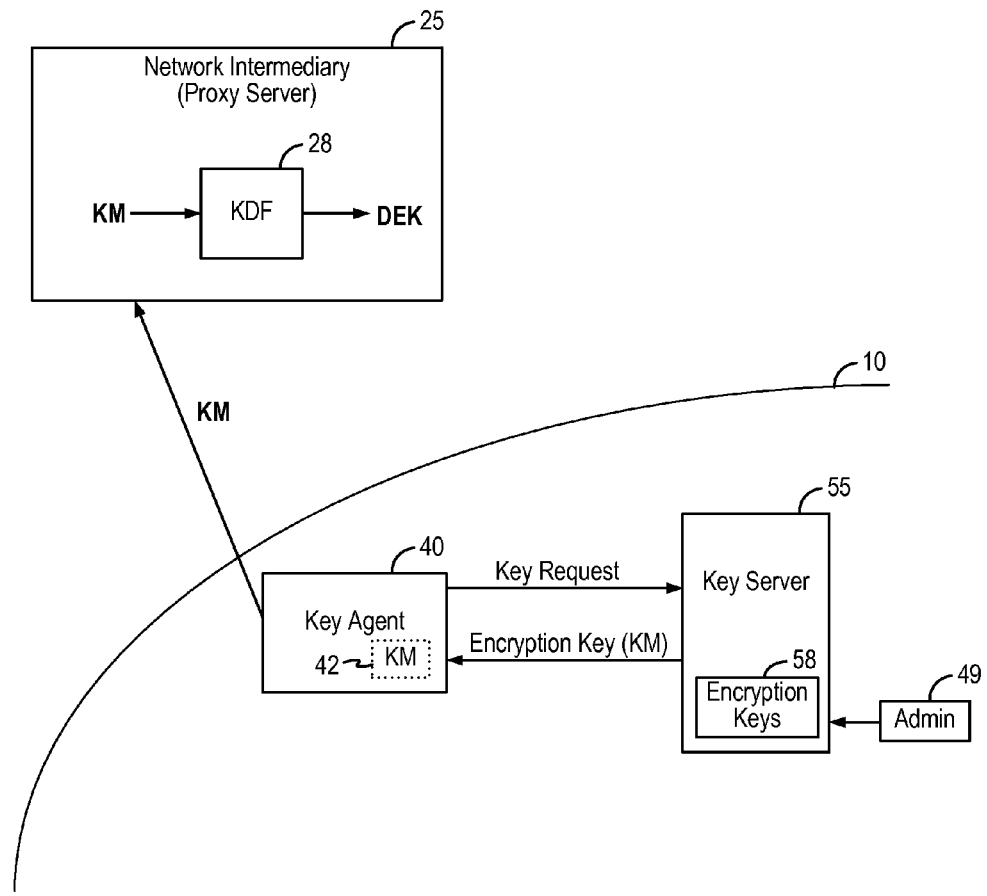
FIG. 4 is a block diagram of an encryption key management system in alternate embodiments of the present invention.

In the above described embodiments, the enterprise data network employs a hardware security module (HSM) to maintain the enterprise's encryption keys. In other embodiments, a key server may be used to maintain the enterprise's encryption keys. FIG. 4 is a block diagram of an encryption key management system in alternate embodiments of the present invention. Referring to FIG. 4, the encryption key management system is implemented in a key agent 40 deployed within the enterprise data network 10. The key agent 40 is in communication with an on-premises key server 55. The key server 55 is running within the enterprise data network 10 and stores the encryption keys of the enterprise data network. A system administrator 49 of the enterprise may manage the encryption keys stored in the key server 55. Key server 55 provides an encryption key or key material in response to a key request.

The encryption key management system manages the key authentication as follows. The key server 55 has stored therein one or more encryption keys 58. The encryption keys 58 are stored in the key server 55 and are never distributed outside of the key server 55. In response to a key request from the key agent 40, the key server 55 provides an encryption key as to the key agent as the key material KM. The key material KM is to be distributed to the network intermediary 25. The network intermediary 25 receives the key material and uses a key derivation function (KDF) 28 to derive or generate a data encryption key (DEK). The network intermediary 25 then uses the DEK in the encryption of the enterprise's data to be stored on a cloud service. The network intermediary 25 also uses the DEK in the decryption of the enterprise's data retrieved from a cloud service provider through the network intermediary.

The network intermediary 25 stores the KM only in short-term or temporary memory. The KM expires after a given time duration and the network intermediary 25 must receive updated key material (KM) provided by the key agent 40 in order to continue to encrypt or decrypt data on behalf of the enterprise. In some embodiments, the key agent 40 distributes KM to the network intermediary 25 on a periodic basis, such as every 5 minutes.

As thus configured, the DEK used by the network intermediary 25 is derived from the encryption key 58 that is brokered from the enterprise by the key agent. Thus, the enterprise can maintain the security of its encryption key while using the network intermediary to provide encryption of data at rest. In the event that the enterprise wishes to revoke the authorization, the enterprise may simply revoke the encryption key 58 provided to the key agent 40. With the encryption key 58 revoked, all the DEK previously generated becomes invalid and the network intermediary will no longer be able to encrypt or decrypt data on behalf of the enterprise. The network intermediary must receive new key material and once again generates new DEK using the key derivation function (KDF) and the new key material (or new encryption key 58).

Figure 5:
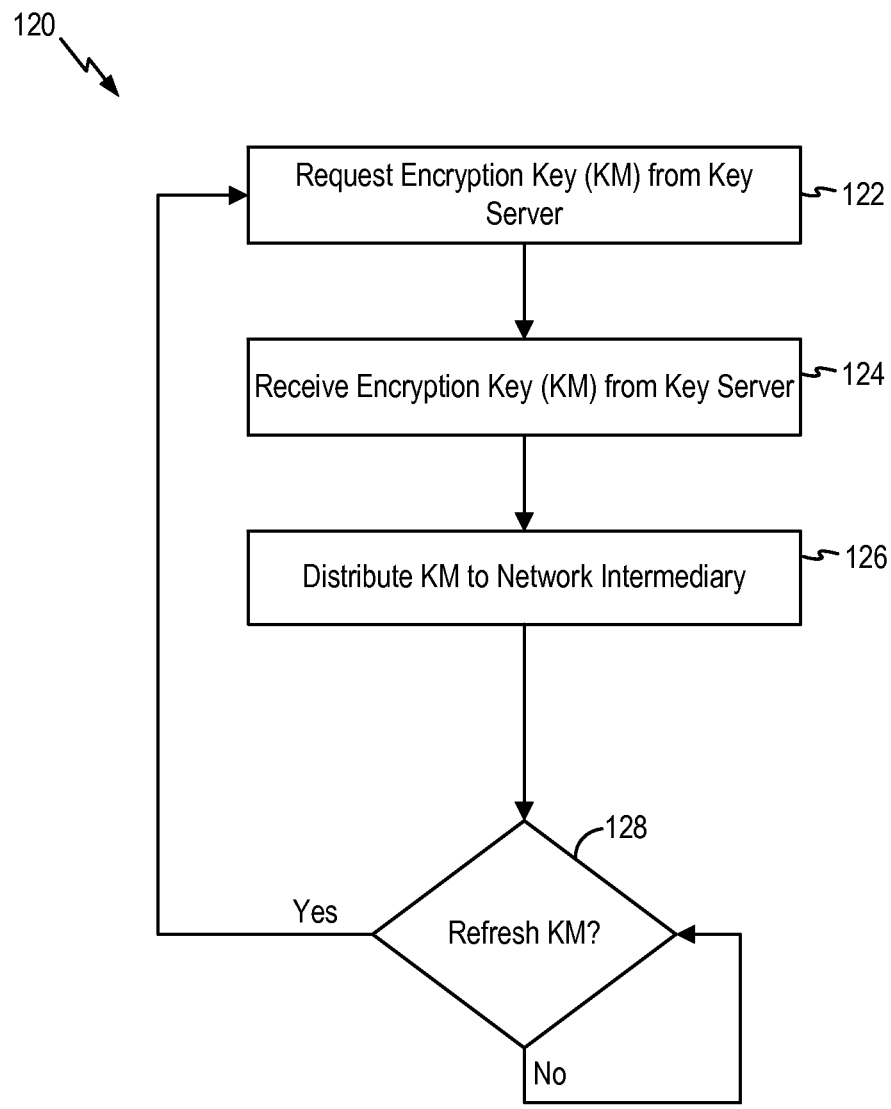
FIG. 5 is a flowchart illustrating an encryption key management method in alternate embodiments of the present invention.

The operation of the encryption key management system of FIG. 4 will now be described with reference to the flowchart in FIG. 5. FIG. 5 is a flowchart illustrating an encryption key management method in alternate embodiments of the present invention. In the present example, the encryption key management method is implemented at the key agent 40 which can be implemented in software, hardware or both. The key agent 40 is in communication with the key server 55 of the enterprise which maintains an encryption key 58 of the enterprise.

Referring to FIGS. 4 and 5, the encryption key management method 120 starts at 122 where the key agent 40 requests an encryption key as the key material from the key server 55. The key agent 40 receives the encryption key to use as the key material from the key server 55 (124). The key agent 40 stores the key material 42 briefly or temporarily to enable distribution of the key material but does not store the key material in persistent memory. For example, the key agent 40 may store the key material 42 in a cache memory.

In the encryption key management system, the key agent 40 distributes the key material 42 to the network intermediary 25 to derive the local DEK of encryption of enterprise's data. The network intermediary 25 does not maintain a key storage but rather only store the key material received from the key agent 40 in cache memory. The key material expires after a brief time period, such as 5 minutes, and is not stored on the network intermediary. The key agent 40 is configured to distribute the key material to the network intermediary on a periodic basis, e.g. every 5 minutes.

At each time interval the key agent 40 needs to distribute the key material, the key agent 40 distributes the key material to the network intermediary 25 (126). Because the network intermediary 25 does not store the key material perpetually, the key agent 40 needs to refresh and redistribute the key material periodically (128). When the key material valid time period expires, the method 120 repeats at 122 where the key agent 40 again requests the key server 55 to provide an encryption key as the key material.

In the above embodiments, the network intermediary is described as supporting a single enterprise and providing encryption and decryption services for that enterprise. In practice, the network intermediary may be configured as a cloud service provider supporting multiple enterprises, also referred to as "tenants" of the network intermediary. Furthermore, the network intermediary may be implemented as two or more network intermediaries using physically separated proxy servers. In that case, a trust model is established between the key agent and the network intermediaries so that the key material (KM) for one enterprise is made available only for specific elements provisioned on a network intermediary that have been trusted by the tenant to encrypt or decrypt the tenant's data. In some embodiments, the tenant establishes the trust model by provisioning of one or more network services on a network intermediary.

In the following description, references to "a network intermediary" refers to a single proxy server configured as a network intermediary or two or more proxy servers configured as two or more network intermediaries.

Figure 6:
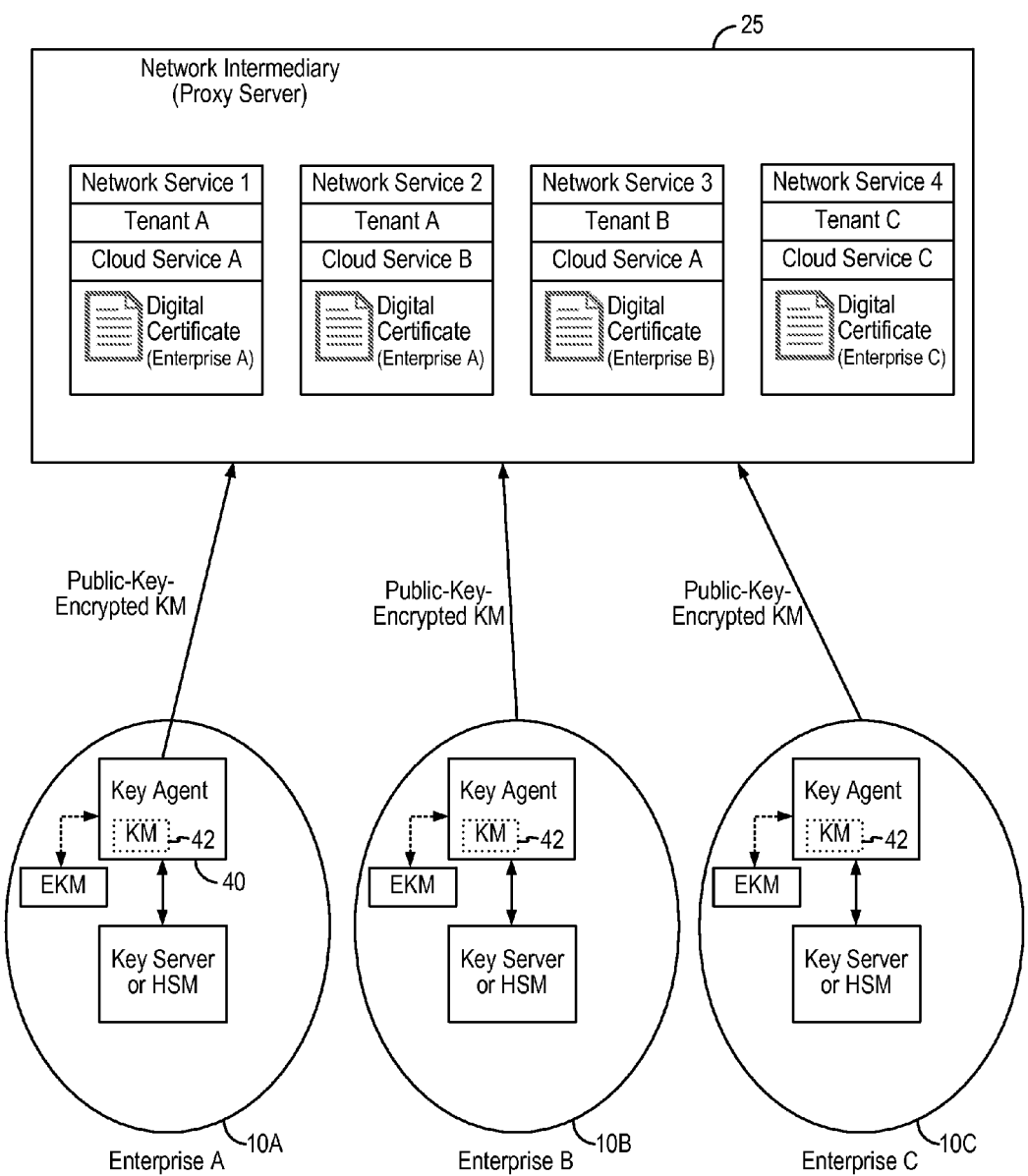
FIG. 6 illustrates the structure of the trust model between the key agent and the network intermediary in the encryption key management system in embodiments of the present invention.

FIG. 6 illustrates the structure of the trust model between the key agent and the network intermediary in the encryption key management system in embodiments of the present invention. Referring to FIG. 6, a network Intermediary 25 is provisioned with network services (1-4) for each tenant and each cloud service provider used by the tenant. For example, an enterprise A, as a tenant A of the network intermediary, may use two cloud services (e.g. Salesforce and ServiceNow). In that case, the network intermediary will be provisioned with two network services for tenant A, one network service for each cloud service provider (Cloud Service A and Cloud Service B). In the case of multiple network intermediaries, the same network service for a tenant and a cloud service provider may be provisioned on one or more network intermediaries.

Every network service is provisioned with a digital certificate or public key certificate to process data traffic through the network service. The digital certificate is the electronic credentials that bind the identity of the network service to a pair of electronic keys (public and private) that can be used to encrypt information digitally. In one embodiment, the digital certificate for each network service is created by the tenant/enterprise and is rooted to tenant's trusted root certificate. Accordingly, each digital certificate is specific to the tenant/enterprise that created the certificate.

In embodiments of the present invention, the on-premises key agent 40 produces unique key material (KM) 42 for each network service and distributes the key material to the network intermediary by leveraging the digital certificate associated with each specific network service. More specifically, in some embodiments, the on-premises key agent 40 of an enterprise encrypts the key material 42 using the public key associated with the digital certificate of the network service. The key agent 40 then sends the public-key-encrypted key material to the network intermediary 25. As thus configured, only the network intermediaries that the particular network service is provisioned on will be able to decrypt the public-key-encrypted key material and generate the data encryption key (DEK). In particular, when a network intermediary receives a public-key-encrypted key material, the network service provisioned on that network intermediary having the associated digital certificate will be able to decrypt the key material using the private key associated with its own digital certificate. Other network services will not be able to decrypt the public-key-encrypted key material.

Note that the public-key-encrypted key material is different from the encrypted key material (EKM) in the case where an HSM is used. The EKM is an encrypted key material stored at the key agent 40 and is encrypted by the KEK of the enterprise. As described above with reference to FIG. 2, each time the key agent 40 is to distribute key material to the network intermediary, the key agent 40 sends the EKM to the HSM 45 of the enterprise to request decryption of the EKM. The decrypted key material is then received by the key agent 40. Then, in accordance with the trust model described herein, the key agent 40 encrypts the key material using the public key associated with the digital certificate of the particular network service. The public-key-encrypted key material is then sent to the network intermediary 25.

Accordingly, by using the trust model with public-key-encrypted key material, an enterprise can be ensured of data security when employing the network intermediary to encrypt cloud data on behalf of the enterprise. The enterprise can be assured that even when the network intermediary is a cloud based service hosting other tenants, the enterprise's data and encryption key are secured and not accessible by other tenants of the network intermediary.

Encryption Service in the Cloud

In some cases, the enterprise may employ the services of cloud service providers running applications for the enterprise. For example, the enterprise may employ the service of an information technology cloud service provider. In that case, the cloud service provider needs to receive data from the enterprise in the clear so the cloud service provider can process the data on behalf of the enterprise. The original or processed data of the enterprise may then be stored at the cloud service provider. The use of these types of cloud service providers prevents the enterprise from encrypting its data when being uploaded to the cloud service providers.

According to another aspect of the present invention, the network intermediary provides a cloud-based encryption service for one or more cloud service providers to enable the cloud service providers to encrypt data at rest using enterprise managed encryption keys. In some embodiments, the network intermediary derives a data encryption key (DEK) from an enterprise managed encryption key or key material. The network intermediary derives a data encryption key for the enterprise and provides the data encryption key to the encryption service. After data processing, one or more cloud service providers used by the enterprise may access the encryption service to encrypt data belonging to the enterprise using the data encryption key associated with the enterprise. The cloud service providers receive encrypted data from the encryption service for storage. In this manner, the enterprise is ensured that data stored at rest at one or more cloud service providers is encrypted.

An advantage of the cloud-based encryption service of the present invention is that the one or more cloud service providers used by an enterprise has seamless access to the cloud-based encryption service provided by the network intermediary to encrypt data on behalf of the enterprise. Meanwhile, the encryption service uses a data encryption key (DEK) that is managed by the enterprise. Accordingly, the enterprise can ensure that the enterprise's cloud data stores across any number of cloud service providers are encrypted according to an enterprise managed encryption key.

Another advantage of the cloud-based encryption service of the present invention is that since the encryption service is attached to the network intermediary, it is possible to encrypt/decrypt data using the encryption service and or encrypt/decrypt data using the network intermediary, which provides flexibility to the enterprise.

In the following description, the term "data" will be used to refer to data or files in any format that is being exchanged in the network environment described herein.

Figure 7:
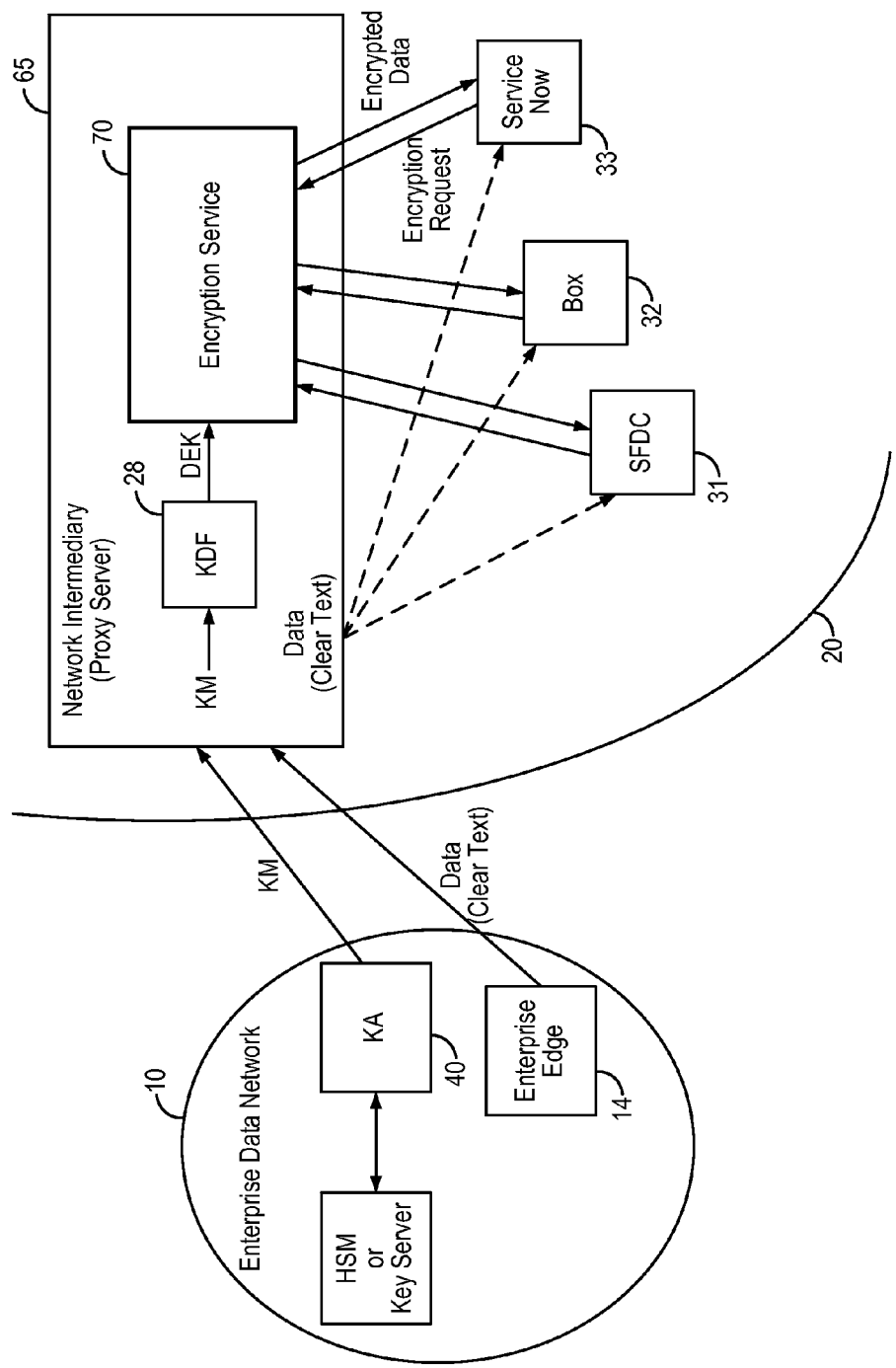
FIG. 7 is a block diagram of a network intermediary incorporating an encryption service in embodiments of the present invention.

FIG. 7 is a block diagram of a network intermediary incorporating an encryption service in embodiments of the present invention. Referring to FIG. 7, a network intermediary 65 may be configured to communicate with an enterprise data network 10 to intercept network traffic from the enterprise data network and to forward the network traffic to cloud service providers. In the present embodiment, the enterprise relies on the network intermediary to perform encryption of data being forwarded to the cloud service providers. In embodiments of the present invention, the enterprise data network 10 implements the encryption key management system described above to maintain control of the enterprise's encryption key. The key agent 14 deployed in the enterprise data network 10 distributes the key material (KM) periodically to the network intermediary 65. The generation and distribution of the key material is described above with reference to FIGS. 2 to 5, using either a key server or an HSM. The network intermediary 65 uses a key derivation function (KDF) 28 to derive or generate a data encryption key (DEK).

The network intermediary has implemented therein an encryption service 70. The encryption service 70 receives the data encryption key (DEK) and performs encryption or decryption of data in response to calls from external systems.

Some cloud services, such as salesforce.com, Box.com, or ServiceNow, process data received from the enterprise before storage. If the enterprise's data is not received in the clear or if the cloud service providers do not have access to the enterprise's data in the clear, then the cloud service providers will not be able to process the data. In embodiments of the present invention, the network intermediary 65 forwards the data to one or more cloud service providers 31-33 in the clear, that is, unencrypted. The providers 31-33 then have access to the actual data from the enterprise and may apply the appropriate workflow to the data and process the data. After processing of the data and before the data is stored in the cloud service providers' database, the providers encrypt the data by calling the encryption service 70. The providers provide data to be stored in clear text and the encryption service 70 encrypts the data and generates encrypted data for the cloud service providers. The cloud service providers 31-33 can then store the encrypted data. In this manner, the cloud service providers have access to the enterprise's data in the clear to perform needed processing and take needed actions. Meanwhile, the cloud service provider is able to store the enterprise data encrypted at rest to ensure security.

One advantage of the encryption service 70 in the network intermediary 65 is that the encryption service 70 is not jurisdictional and any cloud service providers being used by the enterprise may make calls to the encryption service to encrypt data on behalf of the enterprise. Furthermore, when the enterprise implements the encryption key management system and method described above, the enterprise maintains control of the key encryption key being used and the enterprise's key encryption key is not provided to the network intermediary or the encryption service. Accordingly, the encryption service 70 provides seamless access by multiple cloud services providers used by an enterprise and enables the enterprise's data to be stored on multiple cloud services using enterprise managed encryption keys.

When the encrypted data need to be retrieved, the cloud service providers 31-33 may again request the encryption service 70 to decrypt the data. The providers 31-33 may then provide the decrypted data to the network intermediary to be sent to the enterprise data network.

In some embodiments, the encryption service 70 implements per-tenant access authorization. The authentication between the cloud service provider and the encryption service requires a credential that is associated with the tenant.

Figure 8:
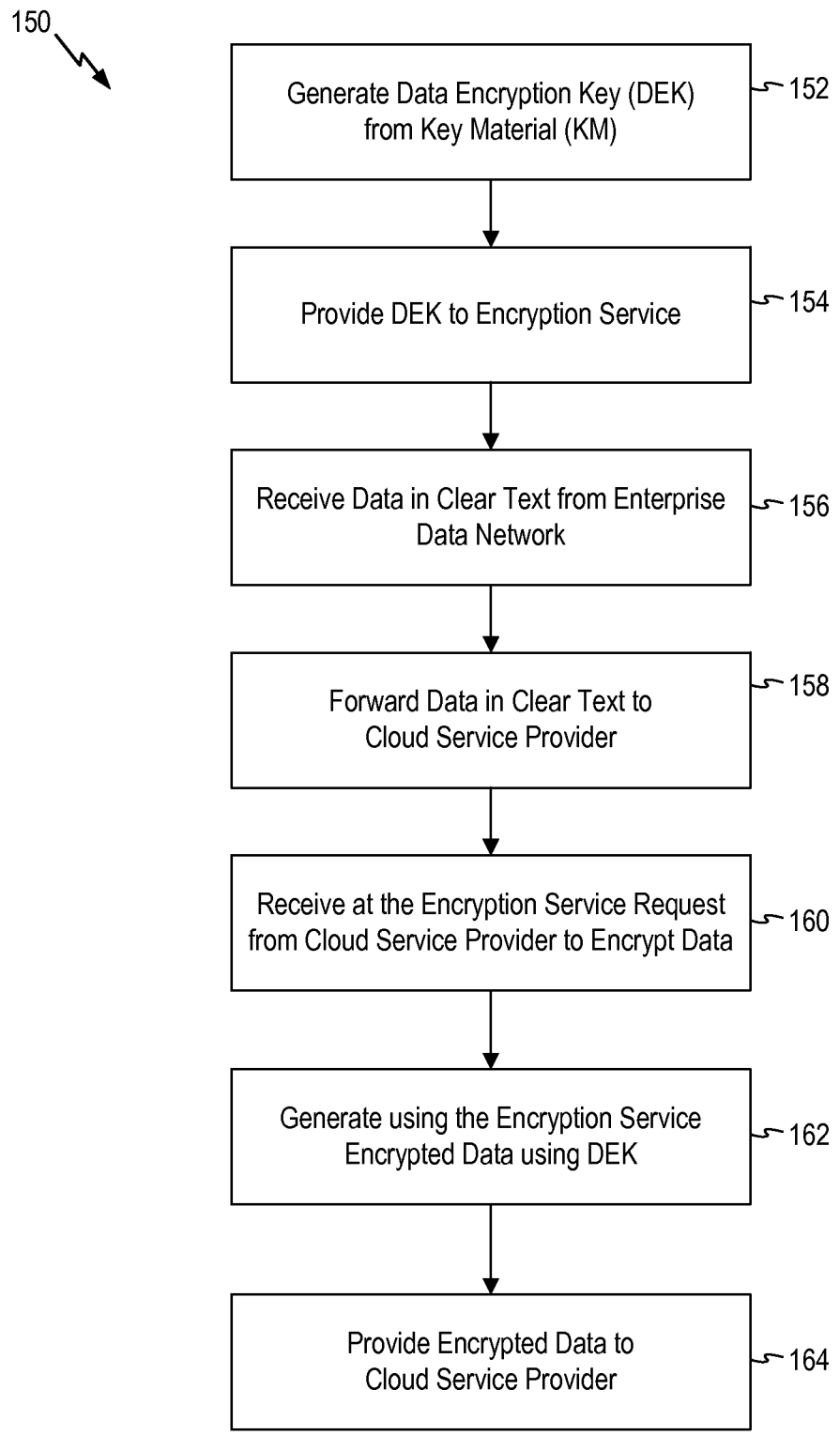
FIG. 8 is a flowchart of a method in a network intermediary providing encryption service embodiments of the present invention.

FIG. 8 is a flowchart of a method in a network intermediary providing encryption service embodiments of the present invention. Referring to FIG. 8, a method 150 starts where the network intermediary generates or derives a data encryption key from a key material received form a key agent of the enterprise (152). The network intermediary provides the DEK to a cloud-based encryption service (154). The network intermediary receives data in clear text from the enterprise data network (156). The network intermediary forwards the data in clear text to a cloud service provider (158). The cloud service provider may process the data, such as by application of a workflow to the data.

Then the encryption service of the network intermediary receives a request from the cloud service provider to encrypt one or more data (160). The encryption service generates encrypted data using the DEK previously derived (162). The encryption service provides the encrypted data to the requested cloud service provider (164).

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of performing cloud-based encryption of data on behalf of an enterprise operating an enterprise data network using an enterprise managed encryption key, comprising:
    generating, using a key agent deployed within the enterprise data network, an original key material;
    storing the original key material on the key agent in a temporary memory;
    generating, using the key agent, a request to a hardware security module to encrypt the original key material, wherein the hardware security module encrypts the original key material using the enterprise managed encryption key being available only within the enterprise data network;
    receiving at the key agent an encrypted key material from the hardware security module;
    storing the encrypted key material on the key agent in a persistent memory;
    generating, using the key agent, a request to the hardware security module to decrypt the encrypted key material, wherein the hardware security module decrypts the encrypted key material using the enterprise managed encryption key being available only within the enterprise data network;
    receiving at the key agent a decrypted key material;
    storing the decrypted key material on the key agent in a temporary memory for a first time period associated with a valid time period for the decrypted key material;
    transmitting the decrypted key material from the key agent to a proxy server deployed outside of the enterprise data network;
    storing the decrypted key material on the proxy server in a temporary memory for the first time period;
    generating, using the proxy server, a data encryption key using the decrypted key material, the data encryption key being used to perform cloud-based encryption of data on behalf of the enterprise; and
    in response to the expiration of the first time period, repeating the generating, using the key agent, the request to the hardware security module to decrypt the encrypted key material to the generating, using the proxy server, the data encryption key using the decrypted key material.

2. The method of claim 1, further comprising:
    removing the original key material from the temporary memory of the key agent after generating a request to a hardware security module to encrypt the original key material, the original key material becoming unavailable after receiving the encrypted key material from the hardware security module.

3. The method of claim 1, wherein receiving an encrypted key material from the hardware security module comprises:
    receiving the encrypted key material from the hardware security module, the original key material being encrypted using an encryption key residing within the enterprise data network or under the control of the enterprise.

4. The method of claim 1, wherein generating, using the proxy server, a data encryption key using the decrypted key material comprises:
    generating, using a key derivation function, the data encryption key using the decrypted key material.

5. The method of claim 1, further comprising:
    transmitting the data encryption key to a cloud-based encryption service;
    receiving at the proxy server clear text data;
    transmitting the data to a cloud service provider for processing;
    receiving, at the encryption service, a request from the cloud service provider to encrypt data;
    generating, using the encryption service, encrypted data in response to the request from the cloud service provider; and
    transmitting the encrypted data to the cloud service provider.

6. A system for performing cloud-based encryption of data on behalf of an enterprise operating an enterprise data network using an enterprise managed encryption key, comprising:
    a key agent deployed within the enterprise data network, the key agent being configured to generate an original key material, store the original key material in a temporary memory, generate a request to a hardware security module to encrypt the original key material where the hardware security module encrypts the original key material using the enterprise managed encryption key being available only within the enterprise data network, receive an encrypted key material from the hardware security module, store the encrypted key material in a persistent memory, generate a request to the hardware security module to decrypt the encrypted key material where the hardware security module decrypts the encrypted key material using the enterprise managed encryption key being available only within the enterprise data network, receive a decrypted key material, store the decrypted key material in a temporary memory for a first time period; and
    a proxy server deployed outside of the enterprise data network, the proxy server being configured to receive the decrypted key material from the key agent, store the decrypted key material in a temporary memory for the first time period, and generating a data encryption key using the decrypted key material, the data encryption key being used to perform cloud-based encryption of data on behalf of the enterprise, wherein the proxy server is configured to repeat receiving the decrypted key material from the key agent and generating the data encryption key using the decrypted key material in response to the expiration of the first time period.

7. The system of claim 6, wherein the key agent is configured to repeat generating a request to the hardware security module to decrypt the encrypted key material in response to the expiration of a first time period.

8. The system of claim 6, wherein the key agent is further configured to remove the original key material from the temporary memory of the key agent after generating a request to a hardware security module to encrypt the original key material, the original key material becoming unavailable after receiving the encrypted key material from the hardware security module.

9. The system of claim 6, wherein the key agent receives the encrypted key material from the hardware security module where the key material is encrypted using an encryption key residing within the enterprise data network or under the control of the enterprise.

10. The system of claim 6, wherein the key agent and the proxy server store the decrypted key material in the respective temporary memory for the first time period associated with a valid time period for the decrypted key material; and wherein in response to the expiration of the first time period, the key agent is configured to repeat generating a request to the hardware security module to decrypt the encrypted key material and the proxy server is configured to repeat receiving the decrypted key material from the key agent to generating the data encryption key using the decrypted key material.

11. The system of claim 6, wherein the proxy server generates the data encryption key using the decrypted key material and a key derivation function.

12. The system of claim 6, wherein the hardware security module comprises a physical hardware security module deployed within the enterprise data network.

13. The system of claim 6, wherein the hardware security module comprises a virtual hardware security module associated with the enterprise data network.

14. The system of claim 6, further comprising:
a cloud-based encryption service deployed at the proxy server, the cloud-based encryption service is configured to receive the data encryption key, receive a request from a cloud service provider to encrypt data, generate encrypted data in response to the request from the cloud service provider, and transmit the encrypted data to the cloud service provider.

15. A method of performing cloud-based encryption of data on behalf of an enterprise operating an enterprise data network using enterprise managed encryption keys, comprising:
generating, using a key agent deployed within the enterprise data network, a request to a key server to request an encryption key as key material, wherein the key server selects the encryption key from the enterprise managed encryption keys available only within the enterprise data network;
receiving from the key server the encryption key to use as the key material;
storing the key material on the key agent in a temporary memory for a first time period associated with a valid time period for the key material;
transmitting the key material from the key agent to a proxy server deployed outside of the enterprise data network;
storing the key material on the proxy server in a temporary memory for the first time period; and
generating, using the proxy server, a data encryption key using the key material, the data encryption key being used to perform cloud-based encryption of data on behalf of the enterprise; and
in response to the expiration of the first time period, repeating the generating, using the key agent, the request to a key server to request an encryption key as key material to the generating, using the proxy server, the data encryption key using the key material.

16. The method of claim 15, further comprising:
removing the key material from the temporary memory of the key agent after the first timer period.

17. The method of claim 15, wherein generating, using the proxy server, a data encryption key using the key material comprises:
generating, using a key derivation function, the data encryption key using the key material.

18. The method of claim 15, further comprising:
transmitting the data encryption key to a cloud-based encryption service;
receiving at the proxy server clear text data;
transmitting the data to a cloud service provider for processing;
receiving, at the encryption service, a request from the cloud service provider to encrypt data;
generating, using the encryption service, encrypted data in response to the request from the cloud service provider; and
transmitting the encrypted data to the cloud service provider.

* * * * *